(12) United States Patent
Ammons et al.

(10) Patent No.: US 9,229,758 B2
(45) Date of Patent: Jan. 5, 2016

(54) PASSIVE MONITORING OF VIRTUAL SYSTEMS USING EXTENSIBLE INDEXING

(75) Inventors: Glenn S. Ammons, West Chester, PA (US); Vasanth Bala, Rye, NY (US); Sastry S. Duri, Yorktown Heights, NY (US); Todd W. Mummert, Danbury, CT (US); Darrell C. Reimer, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 13/527,994

(22) Filed: Jun. 20, 2012

(65) Prior Publication Data

US 2013/0111473 A1     May 2, 2013

Related U.S. Application Data

(60) Provisional application No. 61/552,797, filed on Oct. 28, 2011.

(51) Int. Cl.
G06F 9/455       (2006.01)
(52) U.S. Cl.
CPC ................................. *G06F 9/45558* (2013.01)
(58) Field of Classification Search
None
See application file for complete search history.

(56) References Cited

U.S. PATENT DOCUMENTS

| | | | |
|---|---|---|---|
| 6,848,106 B1 | 1/2005 | Hipp | |
| 7,277,999 B1 | 10/2007 | Agesen et al. | |
| 8,621,233 B1 | 12/2013 | Manadhata et al. | |
| 8,806,625 B1 | 8/2014 | Berger | |
| 2003/0158834 A1 | 8/2003 | Sawdon et al. | |
| 2003/0208463 A1 | 11/2003 | Vishlitzky et al. | |
| 2004/0044996 A1 | 3/2004 | Atallah | |
| 2006/0225065 A1 | 10/2006 | Chandhok et al. | |

(Continued)

FOREIGN PATENT DOCUMENTS

| | | |
|---|---|---|
| WO | 2010144757 A1 | 12/2010 |
| WO | 2011051025 A1 | 5/2011 |

(Continued)

OTHER PUBLICATIONS

Gene H. Kim, Eugene H. Spafford. "Experiences with Tripwire: Using Integrity Checkers for Intrusion Detection". Purdue Technical Report CSD-TR-94-012. Purdue University Libraries , Feb. 21, 1994: 13 pages, plus two cover pages.

(Continued)

*Primary Examiner* — Tammy Lee
(74) *Attorney, Agent, or Firm* — William Stock; Hoffman Warnick LLC

(57) ABSTRACT

Aspects of the present invention provide a solution for passively monitoring a computer system. In an embodiment, an indexing agent operates on a physical server having a plurality of virtual servers. The indexing agent has a framework having a plurality of indexing layers. Each of these indexing layers is adapted to index a virtual server along a different abstraction level to extract abstraction level features indicative of changes in the virtual server. Further, each of the indexing layers has an application programming interface, which is adapted to receive one or more external indexing modules to be plugged into the framework. Each indexing module is adapted to provide instructions to the indexing agent while the indexing layer to which it is plugged is indexing the associated abstraction level of the virtual machine.

26 Claims, 7 Drawing Sheets

(56) References Cited

U.S. PATENT DOCUMENTS

| | | |
|---|---|---|
| 2007/0043896 A1 | 2/2007 | Daruwala et al. |
| 2007/0055710 A1 | 3/2007 | Malkin |
| 2007/0150677 A1 | 6/2007 | Homma et al. |
| 2008/0028034 A1 | 1/2008 | Currid et al. |
| 2008/0065597 A1 | 3/2008 | Vedula |
| 2008/0104217 A1 | 5/2008 | Srinivasa et al. |
| 2008/0134177 A1 | 6/2008 | Fitzgerald et al. |
| 2008/0263658 A1 | 10/2008 | Michael et al. |
| 2009/0094428 A1 | 4/2009 | Nagata et al. |
| 2009/0254990 A1 | 10/2009 | McGee |
| 2009/0319580 A1 | 12/2009 | Lorenz et al. |
| 2010/0030983 A1 | 2/2010 | Gupta et al. |
| 2010/0070725 A1 | 3/2010 | Prahlad et al. |
| 2010/0107158 A1 | 4/2010 | Chen et al. |
| 2011/0131183 A1 | 6/2011 | Chandhok et al. |
| 2011/0161299 A1* | 6/2011 | Prahlad et al. ............... 707/649 |
| 2012/0323853 A1 | 12/2012 | Fries et al. |
| 2013/0111018 A1 | 5/2013 | Ammons et al. |
| 2014/0165198 A1 | 6/2014 | Altman |
| 2014/0337594 A1 | 11/2014 | Wade et al. |
| 2015/0032699 A1 | 1/2015 | Fujita et al. |

FOREIGN PATENT DOCUMENTS

| | | |
|---|---|---|
| WO | 2012132815 A1 | 10/2012 |
| WO | 2012173831 A2 | 12/2012 |

OTHER PUBLICATIONS

Author unknown. "Osiris User Handbook". Archived Feb. 18, 2010. 17 pages Published by The Shmoo Group. Available online: http://web.archive.org/web/20100218111548/osiris.shmoo.com/handbook.html.

U.S. Appl. No. 13/527,948, Office Action dated Dec. 31, 2014, (IBMY-0067), 36 pages.

Richardson, Application No. GB1218642.5, Examination Report dated Oct. 15, 2013, 3 pages.

Gilly et al., "Recent Developments in Patent Enforcement in the Cloud," Nov. 2011, pp. 1-6, BNA's Patent, Trademark & Copyright Journal.

Richardson, Application No. GB1218642.5, Combined Search and Examination Report under Sections 17 and 18 (3), Mar. 3, 2013, 6 pages.

Garfinkel et al., "A Virtual Machine Introspection Based Architecture for Intrusion Detection", NDSS 2003, 16 pages.

H. Pomeranz, "Mounting Images Using Alternate Superblocks", computer-forensics.sans.org/, Dec. 2008, 4 pages.

Nance et al., "Investigating the Implications of Virtual Machine Introspection for Digital Forensics", IEEE, 2009, 978-0-7695-3564-7/09, pp. 1024-1029.

Fu et al., "Space Traveling across VM: Automatically Bridging the Semantic Gap in Virtual Machine Introspection via Online Kernel Data Redirection", 2012 IEEE Symposium on Security and Privacy, pp. 586-600.

Jiang et al., "Stealthy Malware Detection and Monitoring through VMM-Based "Out-of-the-Box" Semantic View Reconstruction", ACM Transactions on Information and System Security, vol. 13,No. 2, Article 12, Publication date: Feb. 2010, 28 pages.

Srinivasan et al., "Process Out-Grafting: An Efficient "Out-of-VM" Approach for Fine-Grained Process Execution Monitoring", Workshop for Frontiers of Cloud Computing, Dec. 1, 2011, 41 pages.

VM Ware, "Server Consolidation using IBM BladeCenter and VMare Infrastructure," 2005, 12 pages.

Kotsovinos et al., "Virtualization: Blessing or Curse?", ACM Que, vol. 8, No. 11, 2010, 3 pages.

Reimer et al., "Opening Black Boxes: Using Semantic Information to Combat Virtual Machine Image Sprawl", VEE '08, Mar. 5-7, 2008, ACM 978-1-59593-796-4/08/03, pp. 111-120.

"Libguestfs, tools for accessing and modifying virtual machine disk images", libguestsfs.org/, May 21, 2013, 2 pages.

Mauelshagen et al., "The Linux Logical Volume Manager", Red Hat Magazine, Issue #9, Jul. 2005, 13 pages.

Paranjape, "Right to Your own Devices", Linux Gazzette #114, May 2005, 9 pages.

Application No. GB1402601.7, Examination Report Response, Apr. 24, 2014, 15 pages.

U.S. Appl. No. 13/920,288, Office Action 1 dated Jul. 17, 2015, 43 pgs.

U.S. Appl. No. 13/968,722, Notice of Allowance dated Aug. 14, 2015, 23 pages.

U.S. Appl. No. 13/527,948, Final Office Action 1 dated Aug. 31, 2015, 36 pgs.

* cited by examiner

PASSIVE MONITORING OF VIRTUAL SYSTEMS USING EXTENSIBLE INDEXING

CROSS-REFERENCE TO RELATED APPLICATIONS

This patent application claims the benefit of U.S. Provisional Application No. 61/552,797, filed on Oct. 28, 2011, which is hereby incorporated herein by reference.

This patent application is related to patent application filed concurrently herewith on Jun. 20, 2012, Ser. No. 13/527,948, entitled PASSIVE MONITORING OF VIRTUAL SYSTEMS USING EXTENSIBLE INDEXING.

TECHNICAL FIELD

The subject matter of this invention relates generally to computer systems management. More specifically, aspects of the present invention provide a solution for improved passive monitoring in a complex virtual environment.

BACKGROUND

In the electronic environment of today, computer systems undergo constant changes. In order to keep up with these changes, it is important that users of these systems be able to monitor the systems. Monitoring can be classified into several different types, including active monitoring and passive monitoring. Passive monitoring includes any observation that does not modify a computer system. To this extent, passive monitoring can include scanning a file system to perform a compliance check, scanning a registry to determine which applications are currently installed on the system, security scanning, file system inspection, license usage monitoring, and the like. In contrast, activities, such as patching, applying a security update, etc., that involve modification of the computer system are referred to as active monitoring.

Standardization can be an asset in effective systems management. Standardization of a data center helps customers control maintenance costs by limiting the number of different variations of systems running in the data center. This allows costs to grow in proportion to the number of different software configurations rather than in proportion to the number of different instances of those configurations.

To realize some of the benefits of standardization, providers of a computer system can insure that all deployed instances begin their lifecycle from one or more standard "images" or pre-configured software stacks. In order to conserve resources, each particular type of deployed instance is often tailored to a type of task that the user of the instance wishes to perform. This can be done by including functions that are useful for performing the particular type of task while leaving out those that are not. In addition, efficiencies can be added by using specific operating systems, middleware, and/or applications that perform the particular type of task efficiently at the expense of those that do not. This can result in the need for several different types of deployed instances generated from different pre-configured software stacks having different combinations of operating systems, middleware, applications, etc., executing on the same computer.

This can become a challenge when it comes to performing passive monitoring operations that need to be performed on a significant number of the deployed instances. One example of this type of operation is drift detection. Once a deployed instance begins execution, it can deviate from the standardized state due to changes within the instance. These changes can be accidental, intentional but without harmful intent, or malicious in nature. In any case, these con-compliant deviations can cause the particular instance not to function correctly and/or can affect the efficiency of the instance within the overall computer system, possibly impacting other instances and/or the overall efficiency of the computer system. However, as the number of types of instances increases, with the increasing numbers of operating systems, middleware and applications, it can be increasingly difficult to provide a single tool for passively monitoring that can be used for all types. Further, any attempt to update or customize the tool could cause the tool to require increasingly more resources or to become unstable.

SUMMARY

In general, aspects of the present invention provide a solution for passively monitoring a computer system. In an embodiment, an indexing agent operates on a physical server having a plurality of virtual servers. The indexing agent has a framework having a plurality of indexing layers. Each of these indexing layers is adapted to index a virtual server along a different abstraction level to extract abstraction level features indicative of changes in the virtual server. Further, each of the indexing layers has an application programming interface, which is adapted to receive one or more external indexing modules to be plugged into the framework. Each indexing module is adapted to provide instructions to the indexing agent while the indexing layer to which it is plugged is indexing the associated abstraction level of the virtual machine.

A first aspect of the invention provides a method for passively monitoring a computer system, comprising: accessing a virtual server by an indexing agent, the indexing agent comprising: an indexing framework having a plurality of indexing layers, each of the plurality of indexing layers having an application programming interface (API); and a first indexing module plugged into a first indexing layer of the plurality of indexing layers using an API of the first layer; retrieving a virtual image of the virtual server by the indexing agent; indexing, for each of the plurality of indexing levels, one of a plurality of unique abstraction levels of the virtual image by the indexing agent to extract abstraction level features indicative of changes in the virtual server, the indexing including the first indexing module providing instructions to the indexing agent while the first indexing layer is indexing a first abstraction level of the virtual system indexed by the first indexing layer; and analyzing at least one of the abstraction level features to perform passive monitoring of the virtual server.

A second aspect of the invention provides a system for passively monitoring a computer system, comprising: a physical server having a plurality of virtual system instances operating thereon; and an indexing agent operating on the physical server, the indexing agent comprising: an indexing framework having a plurality of indexing layers, each of plurality of indexing layers adapted to index a virtual system instance along a unique abstraction level to extract abstraction level features indicative of changes in the virtual server and having an application programming interface (API); and an indexing module, the indexing module being adapted to plug into a first layer of the plurality of indexing layers using an API of the first layer and adapted to provide instructions to the indexing agent while the first indexing layer is indexing an abstraction level of the virtual system indexed by the first indexing layer.

A third aspect of the invention provides a computer program product embodied in a computer readable medium for implementing a method for passively monitoring a computer system, the method comprising: accessing a virtual server by an indexing agent, the indexing agent comprising: an indexing framework having a plurality of indexing layers, each of the plurality of indexing layers having an application programming interface (API); and a first indexing module plugged into a first indexing layer of the plurality of indexing layers using an API of the first layer; retrieving a virtual image of the virtual server by the indexing agent; indexing, for each of the plurality of indexing levels, one of a plurality of unique abstraction levels of the virtual image by the indexing agent to extract abstraction level features indicative of changes in the virtual server, the indexing including the first indexing module providing instructions to the indexing agent while the first indexing layer is indexing a first abstraction level of the virtual system indexed by the first indexing layer; and analyzing at least one of the abstraction level features to perform passive monitoring of the virtual server.

A fourth aspect of the present invention provides a method for deploying an application for passively monitoring a computer system, comprising: providing a computer infrastructure being operable to: access a virtual server by an indexing agent, the indexing agent comprising: an indexing framework having a plurality of indexing layers, each of the plurality of indexing layers having an application programming interface (API); and a first indexing module plugged into a first indexing layer of the plurality of indexing layers using an API of the first layer; retrieve a virtual image of the virtual server by the indexing agent; index, for each of the plurality of indexing levels, one of a plurality of unique abstraction levels of the virtual image by the indexing agent to extract abstraction level features indicative of changes in the virtual server, the indexing including the first indexing module providing instructions to the indexing agent while the first indexing layer is indexing a first abstraction level of the virtual system indexed by the first indexing layer; and analyze at least one of the abstraction level features to perform passive monitoring of the virtual server.

Still yet, any of the components of the present invention could be deployed, managed, serviced, etc., by a service provider who offers to implement passive monitoring in a computer system.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
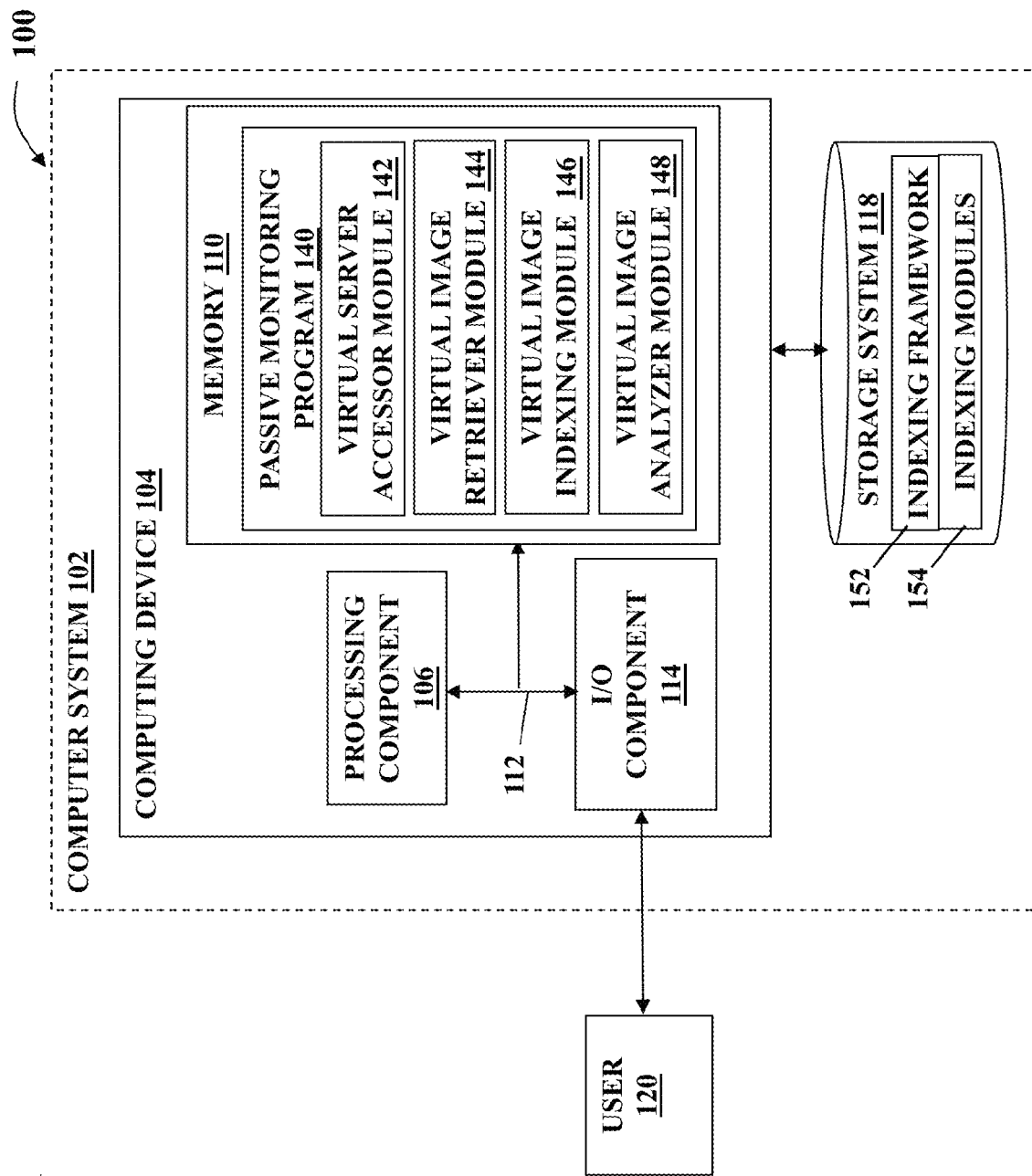
FIG. 1 shows an illustrative computer system according to embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As indicated above, aspects of the present invention provide a solution for passively monitoring a computer system. An indexing agent operates on a physical server having a plurality of virtual servers. The indexing agent has a framework having a plurality of indexing layers. Each of these indexing layers is adapted to index the virtual server along a different abstraction level to extract abstraction level features indicative of changes in the virtual server. Further, each of the indexing layers has an application programming interface, which is adapted to receive one or more external indexing modules to be plugged into the framework. Each indexing module is adapted to provide instructions to the indexing agent as the indexing layer to which it is plugged is indexing the associated abstraction level of the virtual machine.

Turning to the drawings, FIG. 1 shows an illustrative environment 100 for passively monitoring a computer system. To this extent, environment 100 includes a computer system 102 that can perform a process described herein in order to passively monitor a computer system. In particular, computer system 102 is shown including a computing device 104 that includes a passive monitoring program 140, which makes computing device 104 operable to passively monitor a computer system by performing a process described herein.

Computing device 104 is shown including a processing component 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing component 106 executes program code, such as passive monitoring program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data object, etc. Moreover, similar to processing unit 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O interface component 114 can comprise one or more human I/O devices, which enable a human user 120 to interact with computer system 102 and/or one or more communications devices to enable a system user 120 to communicate with computer system 102 using any type of communications link.

To this extent, passive monitoring program 140 can manage a set of interfaces (e.g., graphical user interface(s), application program interface, and/or the like) that enable human and/or system users 120 to interact with passive monitoring program 140. Users 120 could include system administrators and/or clients utilizing resources in a virtual data center environment 200 (FIG. 2), among others. Further, passive monitoring program 140 can manage (e.g., store, retrieve, create, manipulate, organize, present, etc.) the data in storage system 118, including, but not limited to an indexing framework 152 and/or indexing modules 154, using any solution.

In any event, computer system 102 can comprise one or more computing devices 104 (e.g., general purpose computing articles of manufacture) capable of executing program code, such as passive monitoring program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, passive monitoring program 140 can be embodied as any combination of system software and/or application software. In any event, the technical effect of computer system 102 is to provide processing instructions to computing device 104 in order to passively monitor in a computer system.

Further, passive monitoring program 140 can be implemented using a set of modules 142-148. In this case, a module 142-148 can enable computer system 102 to perform a set of tasks used by passive monitoring program 140, and can be separately developed and/or implemented apart from other portions of passive monitoring program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of passive monitoring program 140 fixed thereon (e.g., one or more modules 142-148). However, it is understood that computer system 102 and passive monitoring program 140 are only representative of various possible equivalent computer systems that can perform a process described herein. To this extent, in other embodiments, the functionality provided by computer system 102 and passive monitoring program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, passive monitoring program 140 enables computer system 102 to passively monitor in a computer system. To this extent, passive monitoring program 140 is shown including a virtual server accessor module 142, a virtual image retriever module 144, a virtual image indexing module 146, and a virtual image analyzer module 148.

Computer system 102, when executing virtual server accessor module 142 accesses a virtual server through an indexing agent that can be contained in an indexing appliance.

Figure 2:
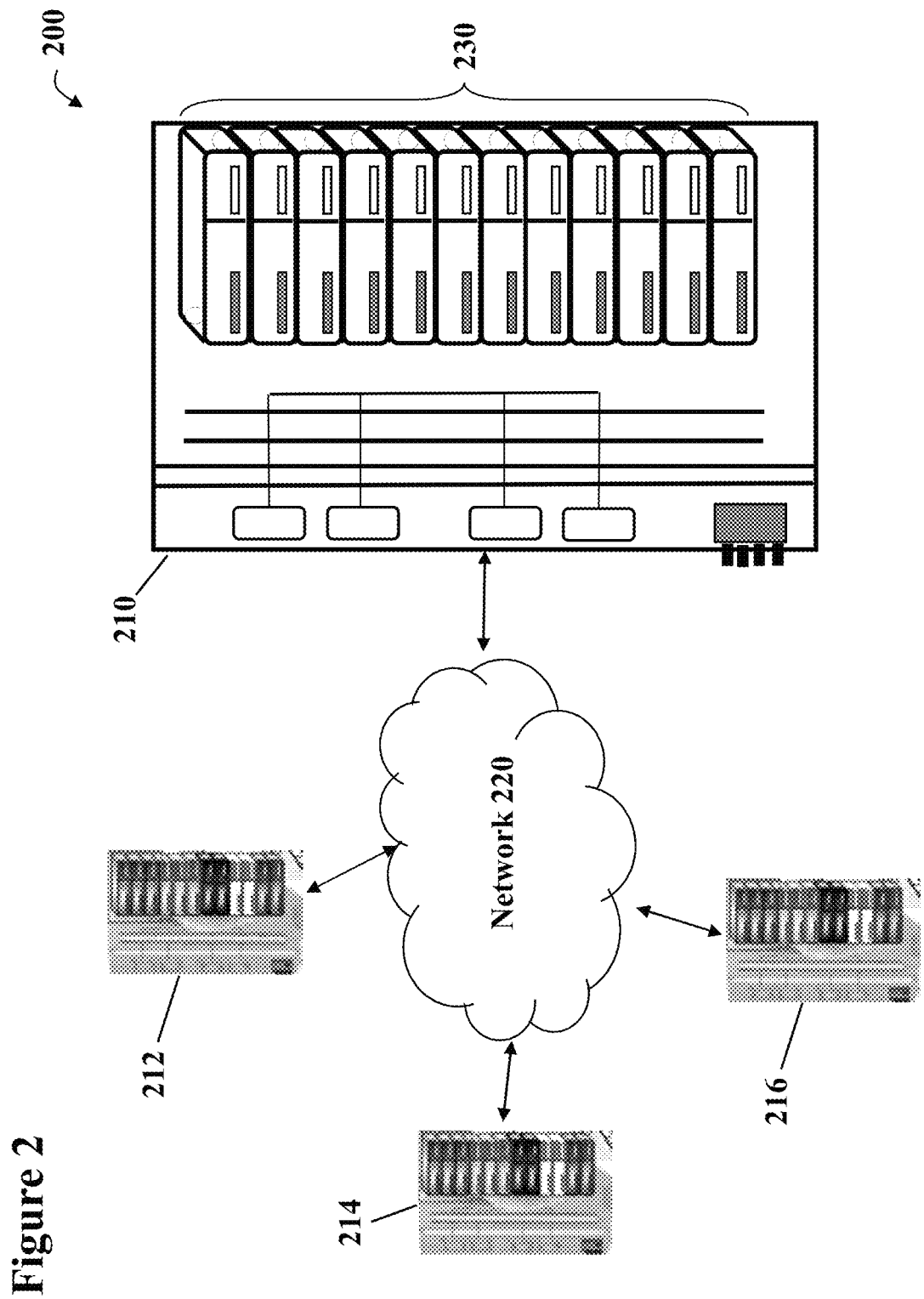
FIG. 2 shows a virtualized datacenter environment according to embodiments of the invention.

Referring now to FIG. 2, a virtualized datacenter environment 200 according to embodiments of the invention is shown. As shown, virtual datacenter environment 200 has a physical server 210 that can be used to perform all or a portion of the functions of passive monitoring program 140 (FIG. 1). To this extent, physical server 210 can be a server from any manufacturer that runs any platform that is adapted to run multiple instances of a virtual server 230. As illustrated in FIG. 2, virtualized datacenter environment 200 can also contain any number of related physical servers 212, 214, 216. Related physical servers 212, 214, 216 can be connected with physical server 210 for communication purposes via a network 220. Network 220 can allow physical server 210 to communicate with related physical servers 212, 214, 216 and/or physical servers 212, 214, 216 to communicate with one another using any communications solution or solutions now known or later developed. In some embodiments, network 220 can operate on a cloud computing scale, providing, e.g., computation, software, data access, and other services that do not require end-user knowledge of the physical location and configuration of the network 220 that delivers the services.

In any case, as stated above, each instance of virtual server 230 on physical server 210 can operate simultaneously with other systems instances 230 while maintaining independence. This means that each of the instances of virtual server 230 operates independently of other instances of virtual server 230 and does not share information with other instances of virtual server 230 even though the instances of virtual server 230 operate on the same physical server 210. Owing to the characteristics of these instances of virtual server 230, a single physical server 210 can execute a very large number of instances of virtual server 230 concurrently. The independent operation of these instances of virtual server 230 ensures that the number of concurrent instances of virtual server 230 is only limited by the hardware constraints of physical server 210.

Figure 3:
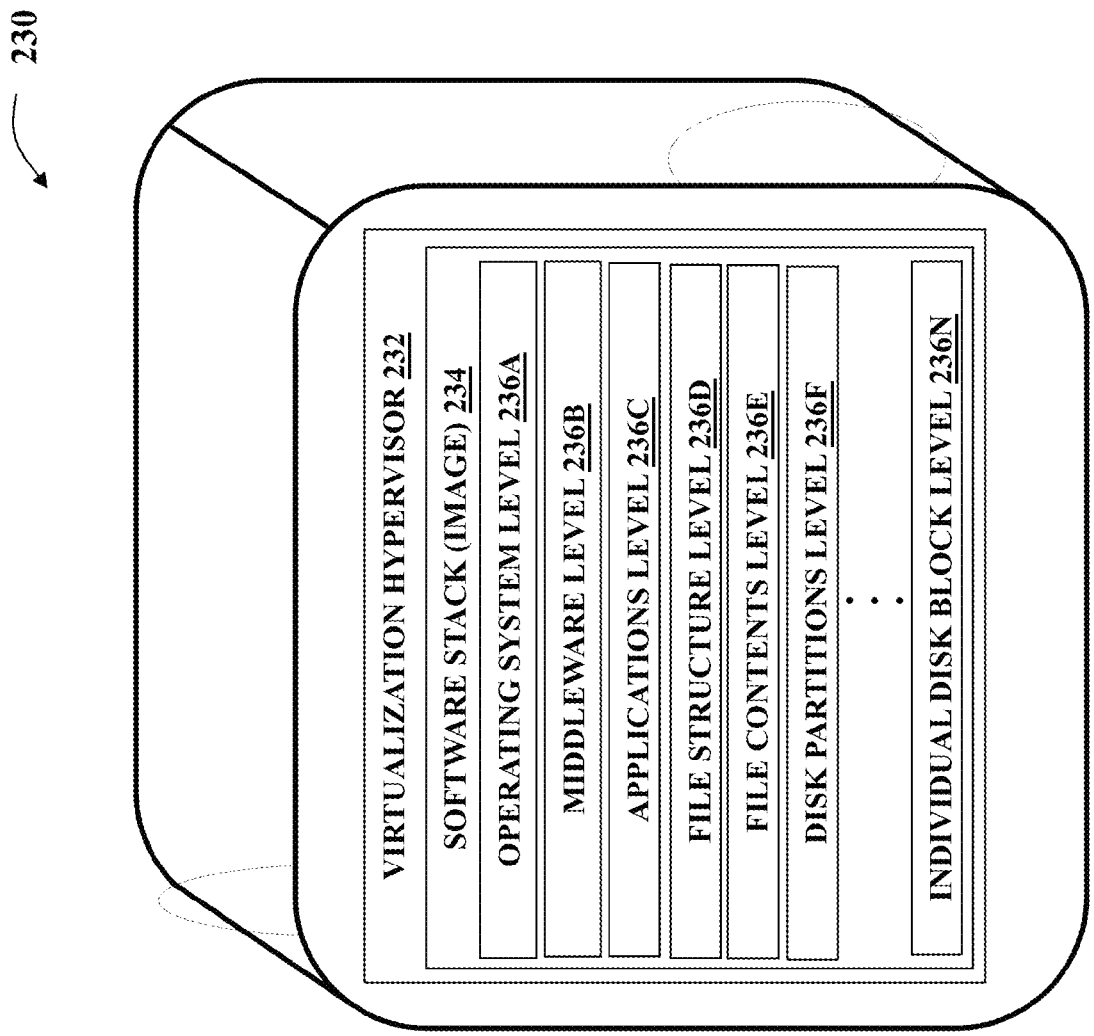
FIG. 3 shows an example virtual server according to embodiments of the invention.

Turning now to FIG. 3, an example virtual server 230 according to embodiments of the invention is shown. It should be understood that virtual server 230 is different from a process virtual machine. A process virtual machine is a platform dependent engine, such as a Java Virtual Machine, that executes platform independent code written in a high-level programming language, such as Java, for performing a specific task (Java and Java Virtual Machine are a trademark of Sun Microsystems in the United States and/or elsewhere). In contrast, the virtual server 230 of the current invention is a virtual system that simulates an entire computing environment. To this extent, rather than performing only a single task, the virtual server 230 of the current invention is an environment within which a variety of tasks, functions, operations, etc., can be carried out by a user 120 (FIG. 1). As such, virtual server 230 can be made to simulate a stand-alone computer system in the eyes of a user 120 (FIG. 1).

To this extent, virtual server 230, includes a virtualization hypervisor 232 at the lowest level. Specifically, virtualization hypervisor 232 provides a platform that allows multiple "guest" systems to run concurrently on the physical server 210 (FIG. 2). To this extent, virtualization hypervisor 232 provides an abstraction level between the hardware level of physical server 210 (FIG. 2) and the higher level software functions of the virtual server 230. In order to provide these software functions, virtual server 230 includes a software stack 234, which can also be referred to as an image. Software stack 234 contains everything that is necessary to simulate a "guest" instance of virtual server 230 on physical server 210 via virtualization hypervisor 232.

Data within software stack 234 can be viewed from a variety of different viewpoints, called abstraction levels 236A-N. At the lowest level of granularity may be an individual disk block level 236N (e.g., a disk block at offset 5.032 from the beginning of software stack 234). A higher level of abstraction may be a disk partitions level 236F that provides access to the disk partitions of software stack 234 (e.g., the swap partition, the boot partition, each file system partition, etc.). Going up more abstraction levels 236A-N, a file structure level 236D and a file contents level 236E can provide access to the structure and contents of the file system software stack 234. In addition, such abstraction levels 236A-N as an applications level 236C, a middleware level 236B and an operating systems level 236A can also be included in software stack 234. It should be understood that the particular abstraction levels 236A-N listed herein should not be taken as exhaustive. Rather, it should be understood that other abstraction levels 236A-N could be included and/or specific abstraction levels 236A-N referenced on FIG. 3 may not be used. In addition, the order in which abstraction levels 236A-N are listed in the illustration should not be construed as limiting. Further, in operation the abstraction levels 236A-N shown herein could be combined, split into other levels or be arranged into functional categories that differ from those illustrated. Still further, in some embodiments, some or all of abstraction levels 236A-N could be dependent upon other abstraction levels 236A-N such that one or more abstraction levels 236A-N are subsumed within a particular abstraction level 236A-N.

As stated above, standardization at this level can significantly decrease maintenance costs by limiting the number of different variations of systems running in virtualized datacenter environment 200. To achieve this, a specific software stack 234 can be generated from one of a limited number of preconfigured stacks. These pre-configured stacks can be optimized for their particular function by providers of virtualized datacenter environment 200 (FIG. 2). For example, if a user 120 (FIG. 1) wants to utilize database functionality, one or more virtual servers 230 having the same software stack 234 based on the same preconfigured stack can be generated specifically for this user 120. These software stacks 234 could, for example, contain an operating system of a type that is appropriate for performing database functions, middleware that contains a database management system, and applications that are configured to run against the database management system. Similarly, if a user 120 (FIG. 1) wants to utilize web server functionality, one or more virtual servers 230 having the same software stack 234 based on a different preconfigured stack from the preconfigured stack used for the database management system can be generated specifically for that user 120 (FIG. 1). These software stacks 234 could, for example, contain an operating system of a type that is appropriate for web server functions, middleware that contains a web server management system, and applications that are configured to run against the web server management system. It should be understood that software stacks 234 that are adapted to perform various other functions within virtualized datacenter environment could be generated as well. To this extent, the operating system can include any operating system now known or later developed. Further, the middleware and applications can include any solutions that can be envisioned for providing the desired functionality for a particular virtual server 230.

The inventors of the current invention have discovered that current passive monitoring systems fail to fully take advantage of the abstraction level 236A-N structure of software stack 234. Further, current passive monitoring systems offer no way for users 120 (FIG. 1) to extend the capabilities of tools used to perform passive monitoring in such a way that the tools themselves can collect special purpose information that may be pertinent to that user's 120 environment. For example, say a customer uses a software component that keeps its configuration metadata in a file /opt/myapp/config. The internal format of /opt/myapp/config is unknown to off-standard detection tools, so all a passive monitoring tool of this sort can do is access it on a higher abstraction level 236A-N, such as to compute its hash on a file structure level 236D. Thus, current passive monitoring tools can tell if /opt/myapp/config changed from one scan to the next, but they cannot tell exactly what changed inside it. This is true even if user 120 (FIG. 1) knows the structure of the configuration metadata and only wants an alert if a specific entry in that file has changed but wants to treat any other changes as benign and to ignore them.

Figure 4:
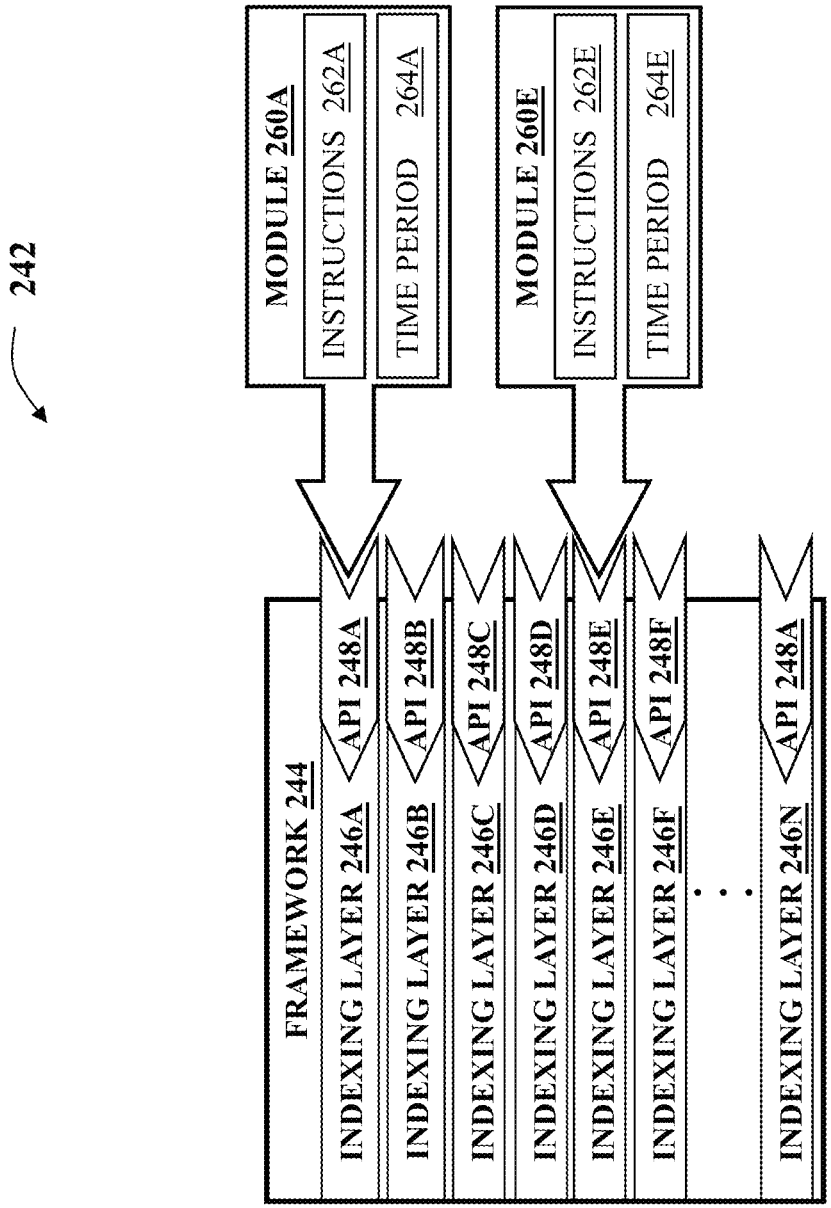
FIG. 4 shows an indexing agent according to embodiments of the invention.

Turning now to FIG. 4, an indexing agent 242 according to embodiments of the invention is shown. As illustrated, indexing agent 242 provides an improved tool for passively monitoring that takes advantage of virtual servers 230 that have multiple abstraction levels 236A-N, such as those shown in FIG. 3. To do so, indexing agent 242 employs a layered approach, having an indexing framework 244 that has multiple indexing layers 246A-N. Described in conjunction with FIG. 3, each indexing layer 246A-N is adapted to index software stack 234 of virtual server 230 along a particular abstraction layer 236A-N. For example, indexing layer 246A could be adapted to index operating system level 236A while indexing layer 246N could be adapted to index individual disk block level 236N. To perform this task, any or all of indexing layers 246A-N can contain imbedded modules (not shown) that allow indexing layers 246A-N to perform default indexing of abstraction levels 236A-N. Each indexing layer 246A-N can also include an application programming interface, which provides extensibility to indexing agent 242 at an indexing layer 246A-N level described herein.

Figure 5:
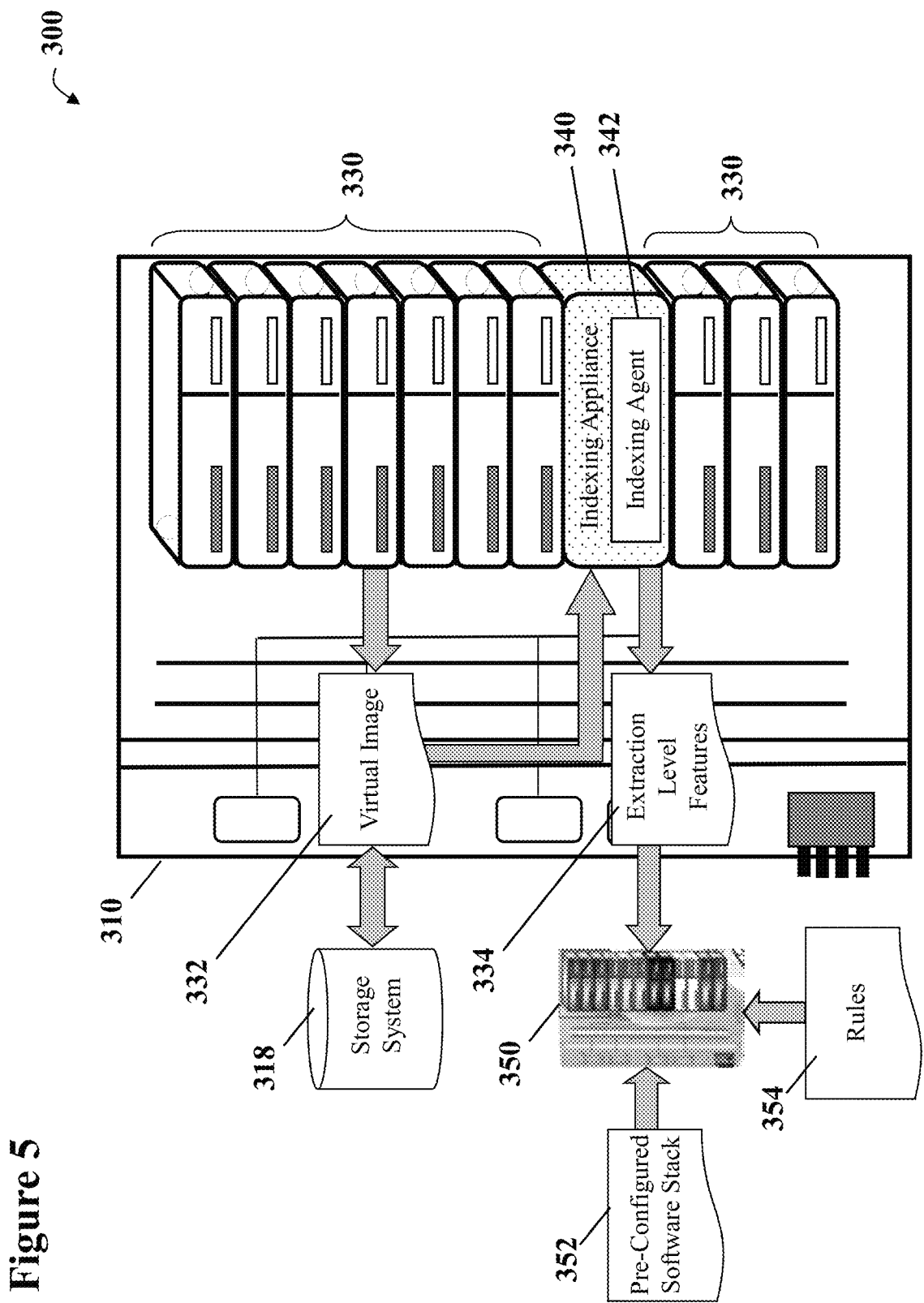
FIG. 5 shows an example server having an indexing agent according to embodiments of the invention.

As also illustrated in FIG. 5, indexing agent 342 can include one or more indexing modules 260A, 260E. Each indexing module 260A, 260E is adapted to plug into a particular indexing layer 246A-246N using API 248A-N included in indexing layer 246A-246N. For example, in the case that user 120 (FIG. 1) desires to perform additional indexing at the operating system level 236A of software stack 234 of virtual server 230, one or more indexing modules 260A can be plugged into an indexing layer 246A that is designated for indexing operating system level 236A using API 248A. Similarly, in the case that user 120 (FIG. 1) desires to perform additional indexing at the file contents level 236E of software stack 234 of virtual server 230 (e.g., to scan the metadata contents of /opt/myapp/config in the above example), one or more indexing modules 260E can be plugged into an indexing layer 244E that is designated for indexing file contents level 236E using API 246E.

In any case, each indexing module 260A, 260E can contain instructions 262A, 262E. These instructions 262A, 262E can be provided by the indexing module 260A, 260E to the indexing layer 246A, 246E to which it is plugged while the indexing layer 246A, 246E is indexing its associated abstraction level 236A, 236E. The ability to plug indexing modules 260A, 260E into indexing agent 242 allows user 120 (FIG. 1) to plug in their own custom logic to extend the capabilities of indexing agent 242 through API 248A-N. As alluded to above with respect to the example given previously, this structure allows user 120 (FIG. 1) to add indexing module 260A, 260E at API 246A-N that will be invoked every time indexing agent 242 visits the file while indexing software stack 234. User's 120 (FIG. 1) logic in instructions 262A, 262E simply checks if this file is /opt/myapp/config, and if it is, indexing agent 242 opens the file and reads the specific entry that user 120 cares about. This gives user 120 (FIG. 1) a much lower level of control over the process of passive monitoring.

In addition, indexing module 260A, 260E can include a time period 264A, 264E, which can indicate conditions that must be fulfilled before indexing module 260A, 260E can be executed. For example, one indexing module 260E could have a time period 264E that specifies that indexing module 260E is to be executed subsequent to another indexing module 260A. Then, when indexing agent 242 is run indexing module 260E will wait for indexing module 260A to execute and then, in response to completion of the indexing by indexing module 260A, indexing module 260E will perform its functions.

Turning now to FIG. 5, an environment 300 that includes an example physical server 310 having an indexing appliance 340 according to embodiments of the invention is shown. As illustrated, in some embodiments indexing appliance 340 is separate from virtual servers 330 on physical server 310 in virtualized datacenter environment 300, and can itself be a virtual server 330. In these environments, indexing appliance 340 contains indexing agent 342 that can perform passive monitoring services for the entire physical server 310. Indexing agent 342 has the framework 244 and the multiple indexing layers 246A-N illustrated in FIG. 4. In this configuration, indexing agent 342 can access any instance of virtual server 330 via virtualization hypervisor 232 (FIG. 3) to perform all of the functions that are necessary for passive monitoring. One result of this is that passive monitoring agents 242 (FIG. 3) can be removed entirely from all instances of virtual server 330. Thus, the overall amount of resources dedicated to passive monitoring can be significantly reduced even when the amount of resources that are dedicated to the indexing appliance 340 are taken into account.

Turning now to FIGS. 1, 3 and 5, concurrently, virtual image retriever module 144, as executed by computer system 102, can retrieve a virtual image 332 of a particular instance of virtual server 330 for which passive monitoring is desired using indexing agent 342. This retrieving can be in response to a request sent to indexing appliance 340 from a central detection server 350 that instructs indexing appliance 340 to perform passive monitoring on a particular instance of virtual server 330 and provides an address at which the virtual server 330 instance is located. In some embodiments, indexing agent 342 can then instruct virtualization hypervisor 232 of virtual server 330 to perform a checkpoint operation in virtual server 330. In these embodiments the checkpoint operation can be a function within virtualization hypervisor 232 that takes a "snapshot" virtual image 332 of the software stack 234 of the virtual server 330 that includes some or all of abstraction levels 236A-N. Virtual image 332 can include data corresponding to both the file system and running state, as well as any other information in software stack 234 at the time of the "snapshot".

In other embodiments, the instruction to checkpoint virtual server 342 can originate from places other than indexing appliance 340. For example, checkpoint operations can automatically occur periodically, such as part of a backup and/or recovery operation. However, the present invention does not depend on the manner in which virtual image 332 was produced, but rather any solution for producing a virtual image 332 of a software stack 234 of a virtual server 330 now known or later developed is envisioned. In any event, upon creation, virtual image 332 can be retrieved directly by indexing agent 342. In the alternative, virtual image 332 can be stored in a storage system 318 for later retrieval by indexing agent 342. It should be understood that storage system 318 can be included within and/or can be external to physical server 310 and can utilize any storage solution.

Referring still to FIGS. 1, 3 and 5, concurrently, virtual image indexing module 146, as executed by computer system 102, can index virtual image 332 of a virtual server 330 retrieved by virtual image retriever module 144. In some embodiments, this indexing can be performed by indexing agent 342 within indexing appliance 340. As such, the indexing can be performed outside of virtual server 330, itself, and can be performed without utilizing agents executing within virtual server 330.

Figure 6:
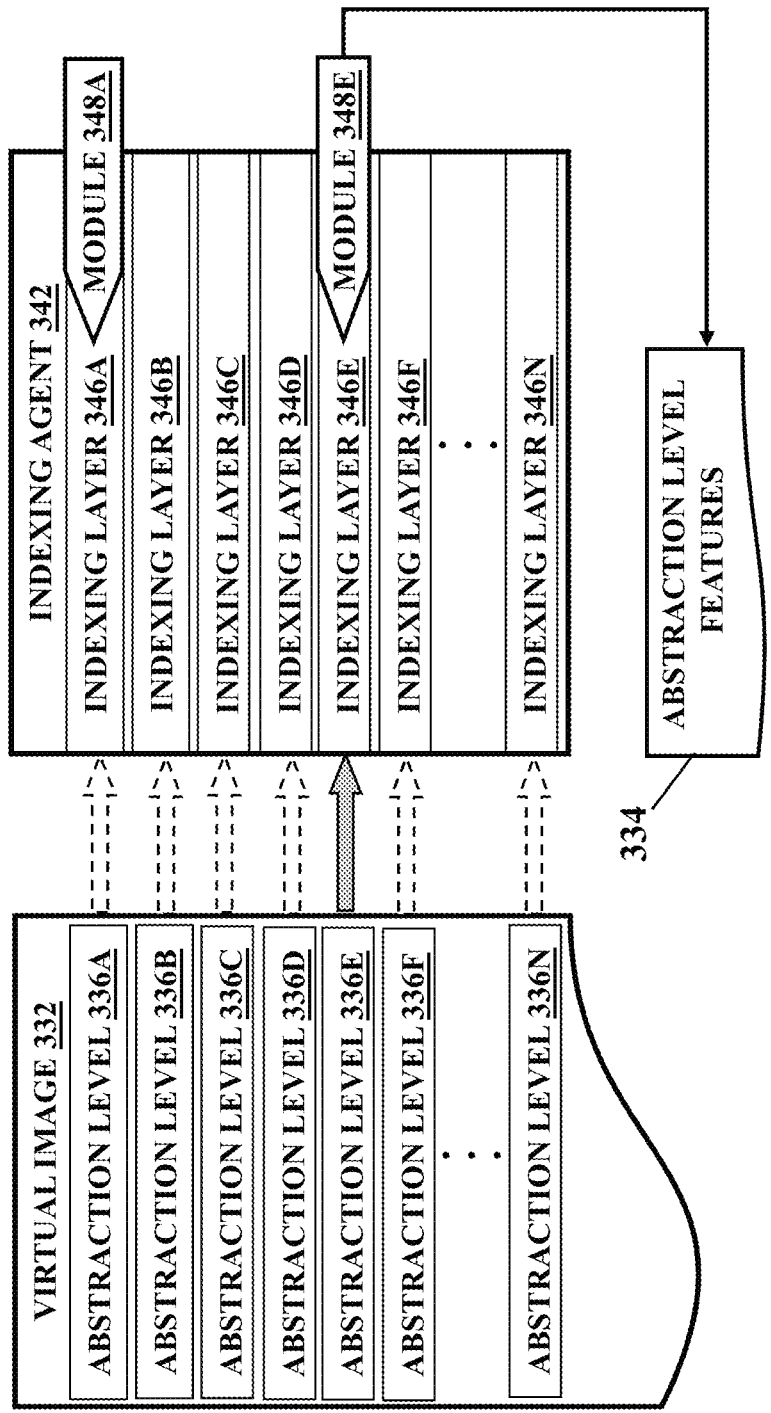
FIG. 6 shows operation of an indexing level in an indexing agent according to embodiments of the invention.

Referring now to FIG. 6, operation 328 of an indexing level 346A-N in indexing agent 342 according to embodiments of the invention is shown. As shown, each indexing level 346A-N in indexing agent 342 corresponds to a different abstraction layer 336A-N in virtual image 332, adapted to index one specific abstraction layer 336A-N. The indexing process can use each indexing layer 346A-N to scan its corresponding abstraction level 336A-N of software stack 234 (FIG. 3) contained within virtual image 332 to extract extraction level features 334 of interest. It should be understood that not all abstraction levels 336A-N need be indexed in every scan. Rather, it could be specified that a single abstraction level 336E (or, in the alternative, a subset of the entirety of abstraction levels 336A-N) be indexed. In any case, for each abstraction level 336A-N to be indexed, the corresponding indexing layer 346A-N will utilize the imbedded modules (not shown) and any plugged in indexing modules 348A, 348E to perform the indexing. As indicated, indexing modules 348A, 348E having instructions 262A, 262E (FIG. 4) configured by user 120 (FIG. 1) and indicating which elements in abstraction levels 336A-N of virtual image 332 should be included in extraction level features 334 can be included for flexibility. For example, in the case that abstraction level 336E is to be indexed, indexing layer 344E would scan abstraction level 336E using its imbedded modules and instructions 262E (FIG. 4) found in module 348E. Results of the indexing would be included in extraction level features 334 for the abstraction level 336E. These extraction level features 334 can include information such as metadata about the files in software stack 234 (FIG. 3) (e.g., their path names, file sizes, last modified date), a checksum of the contents of the files, and/or any other information from software stack 234 (FIG. 3) that can be used to detect whether changes (e.g., due to drift, malware, or the like) have occurred in virtual server 330 (FIG. 5). In some embodiments, the contents of every file are not examined. Instead, only extracted features 334 that have been designated as being sensitive components of virtual server 330 need be extracted for use in the analysis. Further, extracted features 334 could vary based on the type of passive monitoring is to be performed. For example, if the passive monitoring includes scanning for malware, executable files or other files in which malware is likely to be found can be included. In the alternative, control files of other such data files pertaining to conformance of virtual server 330 with an original template can be included in a drift detection type of passive monitoring.

Referring now to FIGS. 5 and 6 concurrently, abstraction level features 334 collected by indexing layer 344E can then be appended to extraction level features 334 resulting from indexing of other extraction levels 336A-N performed by indexing agent 342. Then, if analysis is to be performed on central detection server 350, data corresponding to some or all extraction level features 334 can be forwarded to central detection server 350. In contrast, data corresponding to extraction level features 334 resulting from indexing of single abstraction levels 336A-N could be forwarded for analysis in isolation. Further, it should be understood that analysis could also be performed on-site at physical server 310.

Referring still to FIGS. 1, 3 and 4, concurrently, virtual image analyzer module 148, as executed by computer system 102, can analyze extracted features 334 to perform passive monitoring of virtual server 330. This analysis can differ based on the type of passive monitoring is being performed. For example, in a drift detection analysis, virtual image analyzer module 148 can compare one or more elements of extracted features 334 with at least a portion of a corresponding pre-configured software stack 352. By comparing these two, virtual image analyzer module 148 can compute the difference between the file system structure, contents, state, etc., of each. This difference can consist of three parts: data that has been added, data that have been deleted, and data that has been modified, all relative to pre-configured software stack 352. In contrast, in a malware type analysis, extracted features 334 can be compared with signatures of known malware agents.

Figure 7:
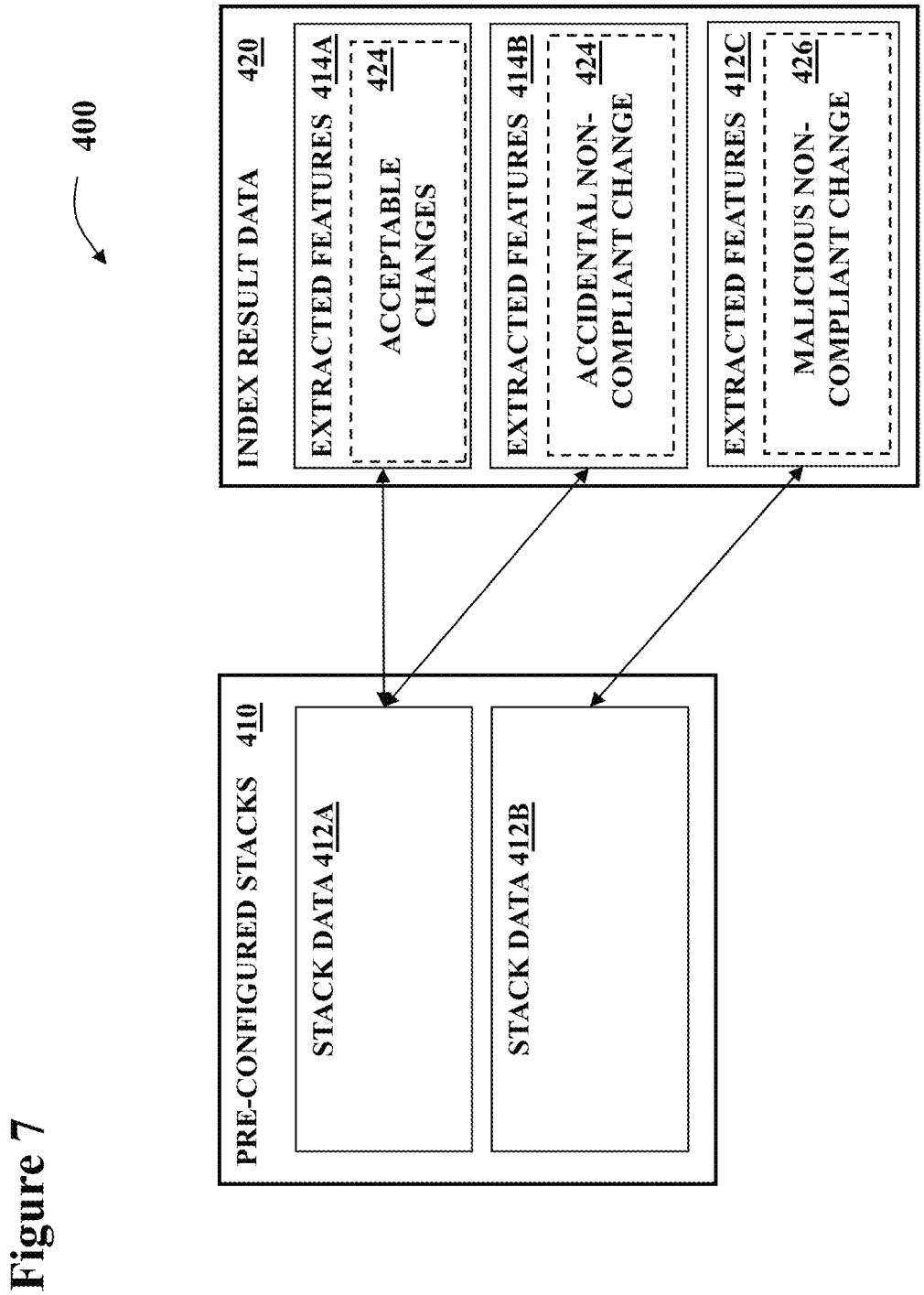
FIG. 7 shows example comparison analyses according to embodiments of the invention.

Referring now to FIG. 7, example comparison analyses 400 according to embodiments of the invention are shown. As illustrated, three sets of index results data 420 are being analyzed. These three sets of index results data 420 are being compared with two pre-configured stacks 410. As shown, extracted features 414A and 414B are from virtual servers 330 (FIG. 4) that were created from the same pre-configured stack, and, as such are being compared with the same set of stack data 412A. In contrast, extracted features 414C has been taken from a virtual server 330 of a different type created from a different pre-configured stack and is being compared with stack data 412B. Extracted features 414A is illustrated as having only acceptable changes 424, and, as such, the comparison with stack data 412A will yield only relatively small differences. In contrast, extracted features 414B and 414C both have non-compliant changes 424, 426 so both of these comparisons will yield large differences when compared with their respective stack data 412A, 412B.

Referring back to FIGS. 1, 3 and 5, concurrently, Once these differences have been ascertained, passive monitoring can be performed by applying rules 354 that define what changes are non-compliant. Passive monitoring can include one or more of such activities as scanning a file system to perform a compliance check, scanning a registry to determine which applications are currently installed on the system, security scanning, file system inspection, license usage monitoring, drift detection, and/or the like. The rules 354 used to perform passive monitoring can be configured by an administrator, a user, or anyone else who needs to evaluate virtual server 330 for non-compliant changes (e.g., drift, malware, etc.). Rules 354 can also be inferred statistically by analyzing differences that occur across many virtual servers 330 in virtualized datacenter environment 300 within a tolerance; can be inferred by automatically classifying files as unvarying (for example, executables), rarely changing (configuration files), or constantly changing (log files); and/or can be inferred from external sources of information such as a description of a cluster's configuration based on an evaluation performed by an evaluation tool. Similar rule-based invariants can be used to detect anomalies or malicious behavior on memory state. Examples of these include, but are not limited to: detecting unknown processes, suspicious network connections, and modifications of code segments.

While shown and described herein as a method and system for passively monitoring a computer system, it is understood that aspects of the invention further provide various alternative embodiments. For example, in one embodiment, the invention provides a computer program fixed in at least one computer-readable medium, which when executed, enables a computer system to passively monitor in a computer system. To this extent, the computer-readable medium includes program code, such as passive monitoring program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as passive monitoring program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for passively monitoring a computer system. In this case, a computer system, such as computer system 12 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", where used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for passively monitoring a computer system, comprising:
    accessing a virtual server by an indexing agent external to the virtual server, the indexing agent comprising:
        an indexing framework having a plurality of indexing layers, each of the plurality of indexing layers having an application programming interface (API); and
        a first indexing module plugged into a first indexing layer of the plurality of indexing layers using an API of the first indexing layer;
        a second indexing module plugged into a second indexing layer of the indexing agent using an API of the second indexing layer, wherein the second indexing module includes a timing instruction for executing the second indexing module subsequent to the first indexing module;
    retrieving a virtual image of the virtual server by the indexing agent;
    indexing, for each of the plurality of indexing layers, a corresponding abstraction level of the virtual image by the indexing agent to extract abstraction level features indicative of changes in the virtual server relative to a pre-configured software stack, the indexing including the first indexing module providing instructions to the indexing agent while the first indexing layer is indexing a first abstraction level of the virtual server indexed by the first indexing layer;
    in response to completion of the indexing by the first indexing module, indexing a second abstraction level of the virtual server indexed by the second indexing layer using instructions provided by the second indexing module to the second indexing layer; and
    analyzing at least one of the abstraction level features to perform passive monitoring of the virtual server.

2. The method of claim 1, wherein the indexing agent is contained in an indexing appliance separate from the virtual server and wherein the retrieving and the indexing are performed without utilizing an internal indexing agent executing within the virtual server.

3. The method of claim 1, further comprising plugging, prior to the accessing, the first indexing module into the first indexing layer using the API of the first indexing layer.

4. The method of claim 3, the analyzing further comprising:
    plugging, prior to the accessing, the second indexing module into the second indexing layer of the indexing agent using an API of the second indexing layer.

5. The method of claim 1, wherein the corresponding abstraction level is selected from a different one of a group consisting of: an individual disk block level, a disk partitions level, a physical properties level, a software packages level, an operating system level, a middle level, a virus detection level, a file structure level, a file contents level, and a file contents hash level.

6. The method of claim 1, further comprising, prior to the retrieving:
    establishing a checkpoint using a built-in snapshot feature of a virtualization layer of the virtual server; and
    generating the virtual image that contains data corresponding to a file system and a running state of the virtual server at a time of the checkpoint.

7. The method of claim 1, further comprising:
    aggregating the abstraction level features for a plurality of the levels to obtain extracted features;
    forwarding data corresponding to the extracted abstraction level features from the indexing to a central detection server; and
    performing the analyzing at the central detection server.

8. The method of claim 1, wherein the abstraction level features are indicative of whether drift has occurred in the virtual server and wherein the analyzing includes determining whether drift has occurred in the virtual server.

9. A system for passively monitoring a computer system, comprising:
    a physical server including a processor and a memory therein, and having a plurality of virtual system instances operating thereon; and
    an indexing appliance including an indexing agent operating on the physical server and external to the plurality of virtual system instances, the indexing agent comprising:
        an indexing framework having a plurality of indexing layers, each of plurality of indexing layers adapted to index a virtual system instance of the plurality of virtual system instances along a unique abstraction level to extract abstraction level features indicative of changes in the virtual system instance relative to a pre-configured software stack, and having an application programming interface (API);
        a first indexing module being adapted to plug into a first layer of the plurality of indexing layers using an API of the first layer and adapted to provide instructions to the indexing agent while the first layer is indexing a first abstraction level of the virtual system instance indexed by the first layer; and
        a second indexing module being adapted to plug into a second layer of the plurality of indexing layers using an API of the second layer, wherein the second indexing module includes a timing instruction for executing the second indexing module subsequent to the first indexing module;
    in response to completion of the indexing by the first indexing module, indexing a second abstraction level of the virtual system instance indexed by the second layer using instructions provided by the second indexing module to the second layer.

10. The system of claim 9, wherein the indexing agent performs a method for passively monitoring the computer system, comprising:

retrieving a virtual image of the virtual system instance;
indexing, for each of the plurality of indexing layers, a corresponding abstraction level of the virtual image to extract the abstraction level features that indicate whether drift has occurred in the virtual system instance, the indexing including the first module providing instructions to the indexing agent while the first layer is indexing the first abstraction level of the virtual system instance indexed by the first layer; and
analyzing the abstraction level features to perform passive monitoring of the virtual system instance.

11. The system of claim 10, wherein the indexing agent is contained in an indexing appliance separate from the virtual system instance and wherein the retrieving and the indexing are performed without utilizing an internal indexing agent executing within the virtual system instance.

12. The system of claim 10, the method further comprising plugging, prior to the indexing, the first indexing module into the first layer using the API of the first layer.

13. The system of claim 12, the analyzing further comprising:
plugging, prior to the accessing, the second indexing module into the second layer of the indexing agent using an API of the second layer.

14. The system of claim 9, wherein each of the plurality of unique abstraction levels is selected from a different one of a group consisting of: an individual disk block level, a disk partitions level, a physical properties level, a software packages level, an operating system level, a middle level, a virus detection level, a file structure level, a file contents level, and a file contents hash level.

15. The system of claim 10, further comprising, prior to the retrieving:
establishing a checkpoint using a built-in snapshot feature of a virtualization layer of the virtual system instance; and
generating the virtual image that contains data corresponding to a file system and a running state of the virtual system instance at a time of the checkpoint.

16. The system of claim 10, further comprising:
aggregating the abstraction level features for a plurality of the levels to obtain extracted features;
forwarding data corresponding to the abstraction level features from the indexing to a central detection server; and
performing the analyzing at the central detection server.

17. The system of claim 10, wherein the abstraction level features are indicative of whether drift has occurred in the virtual system instance and wherein the analyzing includes determining whether drift has occurred in the virtual system instance.

18. A computer program product embodied in a non-transitory computer readable medium for implementing a method for passively monitoring a computer system, the method comprising:
accessing a virtual server by an indexing agent external to the virtual server, the indexing agent comprising:
an indexing framework having a plurality of indexing layers, each of the plurality of indexing layers having an application programming interface (API);
a first indexing module plugged into a first indexing layer of the plurality of indexing layers using an API of the first indexing layer; and
a second indexing module plugged into a second indexing layer of the indexing agent using an API of the second indexing layer, wherein the second indexing module includes a timing instruction for executing the second indexing module subsequent to the first indexing module;
retrieving a virtual image of the virtual server by the indexing agent;
indexing, for each of the plurality of indexing layers, a corresponding abstraction level of the virtual image by the indexing agent to extract abstraction level features indicative of changes in the virtual server, the indexing including the first indexing module providing instructions to the indexing agent while the first indexing layer is indexing a first abstraction level of the virtual server indexed by the first indexing layer;
in response to completion of the indexing by the first indexing module, indexing a second abstraction level of the virtual server indexed by the second indexing layer using instructions provided by the second indexing module to the second indexing layer; and
analyzing at least one of the abstraction level features to perform passive monitoring of the virtual server.

19. The program product of claim 18, wherein the indexing agent is contained in an indexing appliance separate from the virtual server and wherein the retrieving and the indexing are performed without utilizing an internal indexing agent executing within the virtual server.

20. The program product of claim 18, the method further comprising plugging, prior to the accessing, the first indexing module into the first indexing layer using the API of the first indexing layer.

21. The program product of claim 20, the analyzing further comprising:
plugging, prior to the accessing, the second indexing module into the second indexing layer of the indexing agent using an API of the second indexing layer.

22. The program product of claim 18, wherein the corresponding abstraction level is selected from a different one of a group consisting of: an individual disk block level, a disk partitions level, a physical properties level, a software packages level, an operating system level, a middle level, a virus detection level, a file structure level, a file contents level, and a file contents hash level.

23. The program product of claim 18, further comprising, prior to the retrieving:
establishing a checkpoint using a built-in snapshot feature of a virtualization layer of the virtual server; and
generating the virtual image that contains data corresponding to a file system and a running state of the virtual server at a time of the checkpoint.

24. The program product of claim 18, further comprising:
aggregating the abstraction level features for a plurality of the levels to obtain extracted features;
forwarding data corresponding to the extracted abstraction level features from the indexing to a central detection server; and
performing the analyzing at the central detection server.

25. The program product of claim 18, wherein the abstraction level features are indicative of whether drift has occurred in the virtual server and wherein the analyzing includes determining whether drift has occurred in the virtual server.

26. A method for deploying an application for passively monitoring a computer system, comprising:
providing a computer infrastructure being operable to:
access a virtual server by an indexing agent, the indexing agent comprising:
an indexing framework having a plurality of indexing layers, each of the plurality of indexing layers having an application programming interface (API); and a first indexing module plugged into a first indexing layer of the plurality of indexing layers using an API of the first indexing layer;

a second indexing module plugged into a second indexing layer of the indexing agent using an API of the second indexing layer, wherein the second indexing module includes a timing instruction for executing the second indexing module subsequent to the first indexing module;

retrieve a virtual image of the virtual server by the indexing agent;

index, for each of the plurality of indexing layers, a corresponding abstraction level of the virtual image by the indexing agent to extract abstraction level features indicative of changes in the virtual server, the indexing including the first indexing module providing instructions to the indexing agent while the first indexing layer is indexing a first abstraction level of the virtual server indexed by the first indexing layer;

index, in response to completion of the indexing by the first indexing module, a second abstraction level of the virtual server indexed by the second indexing layer using instructions provided by the second indexing module to the second indexing layer; and analyze at least one of the abstraction level features to perform passive monitoring of the virtual server.

* * * * *